L. A. THOMAS.
HITCH.
APPLICATION FILED JUNE 22, 1918.
1,342,725.
Patented June 8, 1920.
2 SHEETS—SHEET 1.
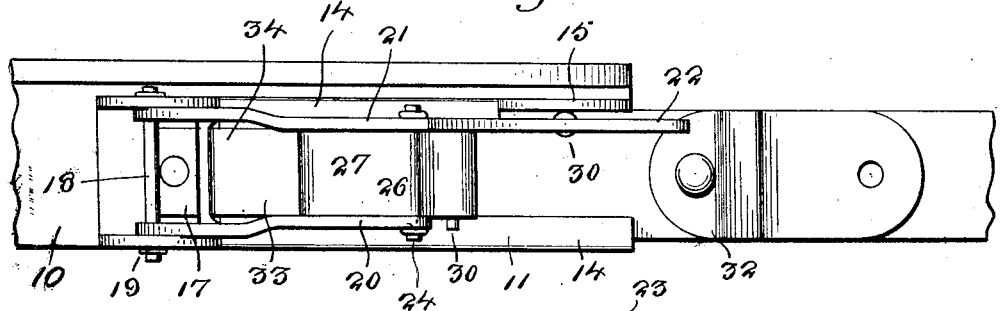
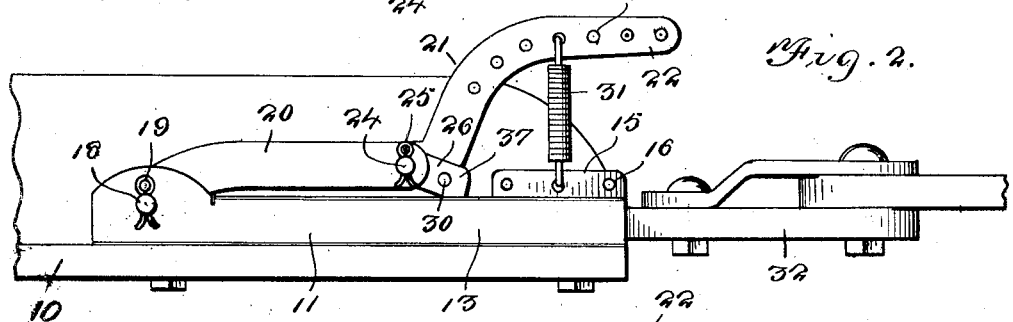
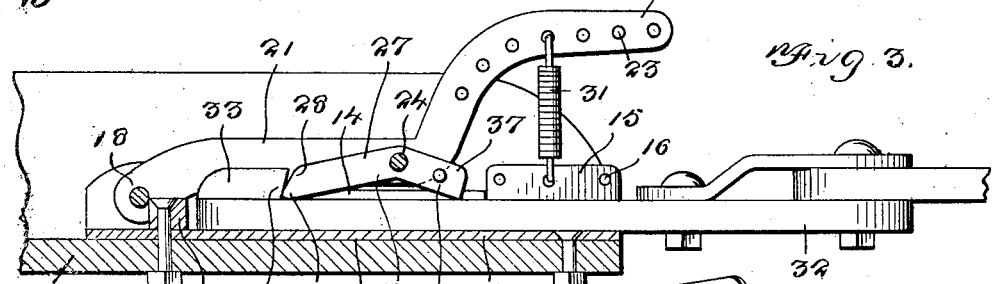
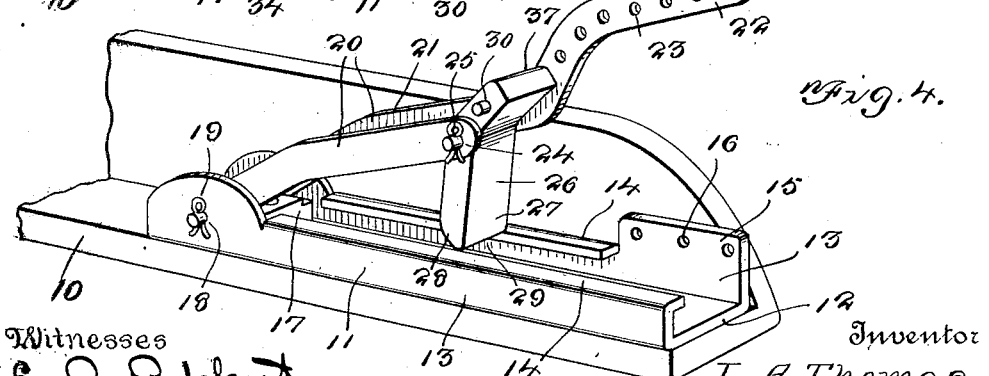
Witnesses
E. R. Ruppert.
Inventor
L. A. Thomas
By Victor J. Evans
Attorney

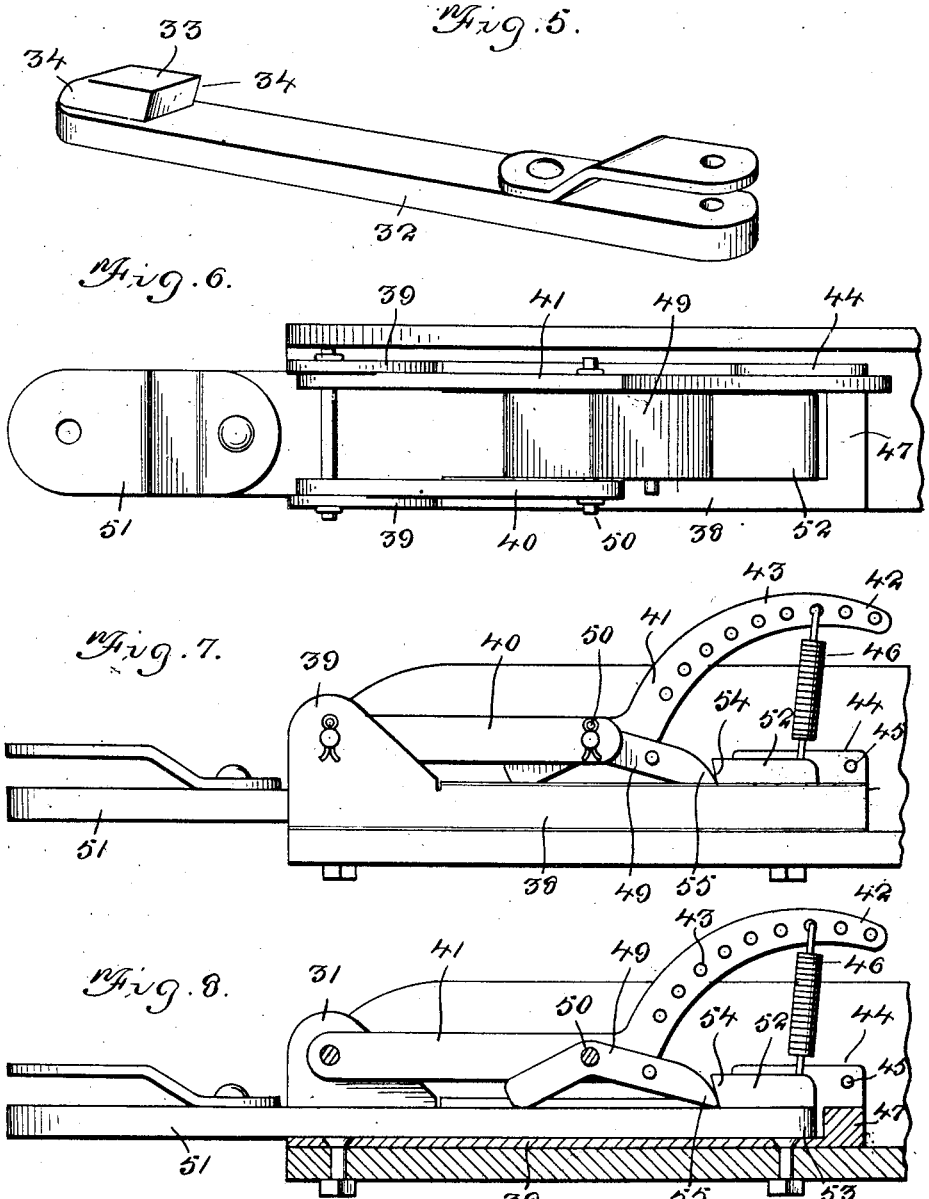

UNITED STATES PATENT OFFICE.

LESLIE A. THOMAS, OF EVANSVILLE, INDIANA.

HITCH.

1,342,725.　　　　Specification of Letters Patent.　　Patented June 8, 1920.

Application filed June 22, 1918. Serial No. 241,378.

*To all whom it may concern:*

Be it known that I, LESLIE A. THOMAS, a citizen of the United States, residing at Evansville, in the county of Vanderburg and State of Indiana, have invented new and useful Improvements in Hitches, of which the following is a specification.

This invention has reference to a means whereby a tractor may be automatically connected to a gang plow, or similar agricultural implement, and readily released when desired.

The primary object of the invention is to produce a hitch between the draft bar of a gang plow and a tractor which shall be of an extremely simple construction, comparatively cheap to manufacture and which will perform the functions for which it is devised with ease and with accuracy.

The several other objects and advantages of the improvement will appear as the nature thereof is better understood, reference being had to the accompanying drawings, in which:

Figure 1 is a top plan view illustrating the application of the improvement;

Fig. 2 is a side elevation thereof;

Fig. 3 is a similar view with parts in section;

Fig. 4 is a perspective view of the member of the improvement on the draft bar of the plow, the spring being detached, and the lever raised;

Fig. 5 is a perspective view of the member connected with the tractor;

Fig. 6 is a plan view, similar to Fig. 1 illustrating a slight modification;

Fig. 7 is a side elevation thereof; and

Fig. 8 is a similar view with parts in section.

Referring now to the drawings in detail, and in Figs. 1 to 5 particularly, the draft beam of a tractor propelled gang plow is indicated by the numeral 10, and to the outer end of this beam is attached what I will refer to as the female member of the hitch and which is generally designated by the numeral 11.

The member 11 includes a flat plate 12 that has its sides flanged upwardly as at 13 and inturned as at 14. The inturned portions 14 extend from the outer end of one of the sides, but the outer end of the opposite side is not formed with the said inturned portion, but is of a width projecting a slight but suitable distance above the said inturned portion. This projecting portion is indicated for distinction by the numeral 15 and is provided with a series of transverse openings 16. The sides, at the inner ends thereof, and outward of the inturned portions or flanges 14 are also widened and have arranged therebetween a block 17. Through the referred to inner portions of the sides passes a pivot pin 18, the same being arranged to the rear of the block 17. The pivot member 18 preferably has its ends provided with openings through which pass securing elements in the nature of cotter pins 19. The pin 18 provides a shaft for the inwardly inclined ends of two plates that constitute the lever of the construction. These plates are indicated by the numerals 20 and 21 respectively, the plate 21 at its outer end being formed with a curved flat extension 22 provided with a series of apertures 23, greater in number than the openings 16 in the end 15 of one of the sides 13. Between the plates 20 and 21 of the lever, at the end of the plate 20 passes a pivot pin 24 that has its ends provided with openings through which pass securing elements preferably in the nature of cotter pins 25. The pin 24 provides a pivot for a dog 26. This dog comprises two angle arms one of a greater length than the other, the last mentioned arm being indicated for distinction by the numeral 27 and the upper and outer corner thereof is rounded as at 28 providing the active face of the dog with a pointed end 29. The dog has its outer end extending a suitable distance beyond the short plate 20 of the lever and the side of this projecting portion is provided with a stock 30 that is designed to contact with the said plate 20 to prevent the dog from swinging entirely around its pivot 24.

In one of the perforations of the curved end of the plate 21 is arranged one end of a helical spring 31, the opposite end thereof being received in one of the perforations or openings 16 in the side 13. The spring normally swings the lever against the channeled plate 12, so that the active pointed end 29 of the angle dog 27 rests on the inner face of the said plate 12, and the provision of the hook-shaped end of the lever and the side of the channeled plate 12 with the spaced openings, perforations or apertures, permits of the proper adjustment of the spring to force the lever against the channeled plate 12 to suit different conditions, as will hereinafter be better understood.

The coupler bar or male element of the hitch is indicated by the numeral 32 and is of a width corresponding to that of the channel in the member 11. On the inner end of the bar 32, and upon the upper surface thereof is arranged a lug 33. This lug is of a less width than the bar proper, being substantially equal to the distance between the inturned upper portions of the flanges 14 of the channeled plate 12. The corners of the bar 32, at the end thereof formed with the lug are cut away angularly as indicated by the numerals 34, so that this end of the bar is reduced at the corners thereof, permitting the same to be properly directed into the channel of the plate 12. By providing one of the side walls 13 with the projecting portion 15, it will be seen that the mouth of the channel in the plate 12 is widened so that the angle corners of the reduced bar 32 contacting either of the sides 13 of the plate 12 will be properly directed through the channel thereof, and the end of the bar 32 contacting with the block 17 halts the passage of the bar through the channel. The lug 33 will travel under the angle dog 26, and preferably the outer edge of the said lug is beveled inwardly as indicated by the numeral 37 so that the pointed end 29 at the engaging face of the dog will properly contact with the lug for holding the bar 32 or what may be termed the male member of the hitch in proper locked position in the female member of the hitch.

A hitch constructed as above described may be manufactured and marketed at a comparatively low cost. The adjustment between the lever and the channeled plate may be secured to permit a desired adjustment between the lever and the channeled plate to suit the conditions of the ground on which the plow works so that the male member can be released from the female member when the plow strikes a stump or rock, thus automatically releasing the tractor from the plow. The hitch permits of the tractor backing the plow without injuring parts of the hitch or uncoupling the same, which is a very important feature of the construction, the end of the male member contacting with the block 17 of the female channeled member 12 when such backing takes place, while the coupling of the members is, as previously stated, automatic.

In Figs. 5 to 8 of the drawings I have illustrated a slight modification. The female member, which is attached to the draft bar of the plow comprises a channeled plate 38, the sides of which, upon the outer ends thereof being provided with widened portions or extensions 39, and between these extensions are pivotally secured the arms or plates 40 and 41 respectively of the pawl carrying lever. It is to be noted that the upper flanges of the channeled member 38 terminate at the inner ends of the extensions 39 of the sides, thus providing a wide mouth for the said member. The plate 41 is provided with an arched or hook-shaped extension 42 having a plurality of closely spaced transverse apertures 43, and the side of the member 39 below the said hook-shaped end of the plate 41 has a straight extension 44 provided with spaced apertures 45. Through certain of the apertures 43 and 45 are passed the ends of a helical spring 46 whereby the pressure of the lever in the direction of the member 38 may be regulated. The arms or plates of the lever rest on the inturned upper flanges of the channeled member 38, and the said member, at its rear or inner end is provided with a stop block 47. The angle dog is indicated by the numeral 49 and is pivotally secured, as at 50, between the plates or arms of the lever, the said dog being of a construction substantially similar to that previously described. The male member is indicated by the numeral 51 and is of a similar construction to the bar 32, having at the inner end thereof a centrally arranged upstanding lug 52 and its corners rounded from the said lug as at 53. The inner face of the lug may be slightly beveled as at 54 to engage with the beveled active end 55 of the angle dog 49. The block 47 provides a stop for the male member, but the male member is normally out of engagement with this stop when the beveled inner face thereof is engaged by the dog, but, of course, contacts with the said stop when the tractor is moved in a rearward direction to back the plow.

It is believed from the foregoing description, when taken in connection with the drawings that the simplicity of the construction and the advantages of the device will be apparent.

Having thus described the invention, what is claimed as new, is:—

1. In a hitch for the purpose set forth, a channeled member, a stop block on the inner end thereof, an arched lever pivoted to the sides thereof, an angle pawl pivotally connected to the lever, a movable member having a lug thereon designed to be received in the channeled member and to be limited in its inward movement therein by contact with the block, and the said pawl adapted to engage with the block of the movable member whereby to detachably lock said members.

2. In a hitch for the purpose set forth, a channeled member having an open top and its sides at its outer end projected above said top, a block at the inner end of said member, a lever comprising spaced bars pivotally secured between the extending sides of the channeled member, one of said bars having an upwardly arched end projecting beyond the other bar, an angle dog pivoted between the bars, a spring adjustably connected to the angle end of one of the bars and to the inner end of the channeled member, a member slidable in the channeled member and adapted to be limited in its inward movement by contact with the block therein, a lug on the movable member designed to be engaged by the dog, and whereby both of said members are detachably connected.

3. In a hitch for the purpose set forth, a channeled member having an open top and its sides at its outer end extended above the top, and one of the sides at its inner end also extending above the top, a block secured to the inner end of the channeled member, a lever comprising spaced bars pivotally secured between the extending sides at the outer end of the member, one of said bars having an arched end projecting beyond the end of the other bar, the said end having a plurality of spaced apertures, an angle pawl pivoted between the arms of the lever, the active end of said pawl being inclined, the projecting side at the inner end of the channeled member having spaced apertures, a member movable in the channeled member, said movable member having a centrally arranged block at its inner end and its corners beveled to the sides thereof from the sides of the block, the inner face of the block being arranged at an inclination and being designed to be engaged by the active end of the angle pawl, and a removable spring having its end secured in certain of the perforations in the arched end of the lever and in the projecting side at the inner end of the channeled member.

4. A draft coupler comprising a plurality of separably connected members adapted for engaging a power member and a load member, respectively; a trigger operatively uniting said members when disposed in parallel arrangement; a swinging member pivotally connected with one of said members and with said trigger for supporting the latter; and yielding means for depressing the free end of said swinging member for holding said trigger in operative relation to said separable members.

In testimony whereof I affix my signature.

LESLIE A. THOMAS.